United States Patent

[11] 3,599,727

[72] Inventor Robert B. Gates
 Route 2, Loraine, N. Dak. 58753
[21] Appl. No. 772,892
[22] Filed Nov. 4, 1968
[45] Patented Aug. 17, 1971

[54] HARROW ATTACHMENT FOR CULTIVATORS
 1 Claim, 3 Drawing Figs.
[52] U.S. Cl. ..................................................... 172/142,
 172/160, 172/707, 172/741
[51] Int. Cl. ...................................................... A01b 33/02,
 A01b 23/02
[50] Field of Search ........................................ 172/707,
 708, 142, 251—253, 705, 642, 643, 706, 741;
 111/85; 56/400

[56] References Cited
 UNITED STATES PATENTS
1,342,125  6/1920  Mackey ........................ 172/741 X
2,136,851  11/1938  Jess ............................... 172/142
2,158,299  5/1939  Oppenheim ................... 172/707 UX
2,741,966  4/1956  Slocum .......................... 172/142
2,758,531  8/1956  Siems ............................ 172/142
3,322,203  5/1967  Johnson ........................ 172/142

Primary Examiner—Robert E. Pulfrey
Assistant Examiner—J. Reed Fisher
Attorney—Robert E. Kleve ABSTRACT: This invention consists of a horizontally disposed steel tube having a plurality of spaced openings therein. A steel bar, that likewise has a plurality of matching spaced openings therein, is located in the just mentioned steel tube. A spring tooth is secured to each end of the steel tube by having its upper end wound around the tube and terminating in a loop on the bottom of the tube through which a bolt is located in one of the aforesaid openings. A steel fitting, which embodies a tube through which the first mentioned steel tube is slidably passed, provides a means of securement by two bolts to one of the spring tooth shanks of a cultivator, which may have any number of these inventions secured thereto.

PATENTED AUG 17 1971 3,599,727

INVENTOR
ROBERT B. GATES

HARROW ATTACHMENT FOR CULTIVATORS

This invention relates to farm machinery; more particularly, to that piece of farm machinery known in the art as a cultivator; still more particularly, to an attachment that permits a cultivator to be as a harrow.

For the benefit of those having limited knowledge of the farm machinery art, it is to be understood that a cultivator is a machine that is used for tillage of the soil after the crop has grown to such an extent that a harrow or weeder cannot be used. A farmer of limited means will therefore often decide that the cultivator is the most desirable piece of machinery to have when he can only afford a single machine for his farm. The cultivator is often used instead of a plow for seed bed preparation. A harrow is a farm machine used to level the ground and crush the clods, to stir the soil, and to prevent the growth of weeds.

It is therefore the principal object of this invention to provide a harrow attachment for cultivators that will, as its name implies, permit a cultivator to be used as a harrow.

Another object of this invention is to provide a harrow attachment for cultivators that is so constructed as to permit adjustment for use on nearly any size cultivator.

Still another object of this invention is to provide a harrow attachment for cultivators that can be attached to a cultivator in a minimum of time and with a minimum of effort.

Other and further objects and advantages of this invention will doubtless come to light as the reading of this specification and its appended claims proceeds and the accompanying drawing is examined.

In the drawing.

In the several views of this invention, like parts are indicated by like reference numbers.

The reference number 7 indicates this invention in its entirety.

Figure 1:
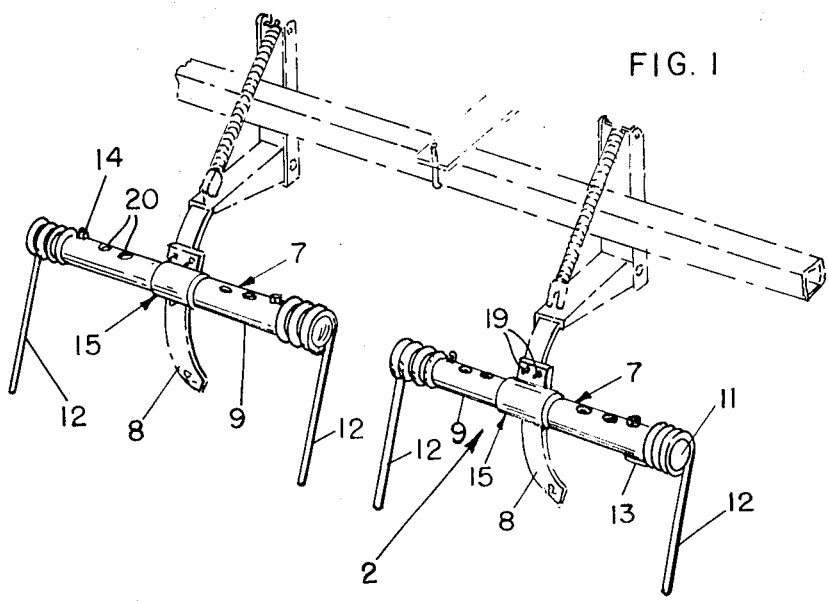
FIG. 1 is a pictorial view of this invention attached to a vibrashank cultivator.

Looking first at FIG. 1 of the accompanying drawing, it will be seen and understood by those experienced in the farm machinery art that a cultivator may have any desired number of the units that go to make up this invention. Each unit or invention is secured to one of the spring tooth shanks 8 of a cultivator, as will hereinafter be described.

Figure 2:
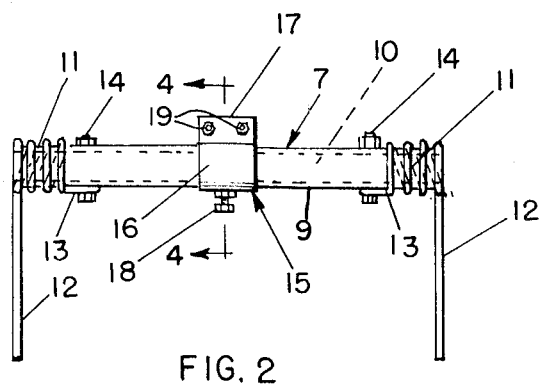
FIG. 2 is a view of this invention as indicated by the arrowed line and number 2 in FIG. 1.
Figure 3:
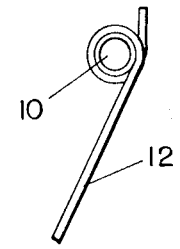
FIG. 3 is a side view of one of the parts of this invention known in the art as a tooth.
Figure 4:
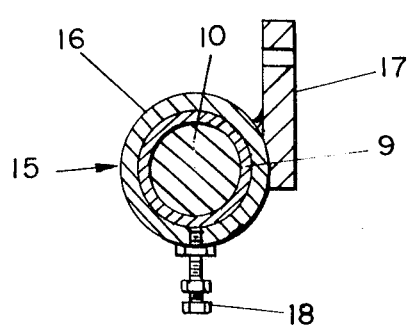
FIG. 4 is a sectional view of this invention, taken substantially along line 4—4 of FIG. 2, and viewed in the direction indicated by the arrows.

This invention 7 embodies a horizontally disposed steel tube 9 in which is located a steel bar 10 having each end 11 even with the ends of the aforesaid steel tube 9. This is in order to provide support for the upper end of each spring tooth 12. Each spring tooth is made of a spring steel wire and has its lower end downwardly extending into the ground, as will be understood by those experienced in the farm machinery art. Each spring tooth 12 has its upper end wrapped around one end of the aforesaid steel tube 9, and terminates in a loop 13 through which passes the lower end of the bolt 14 which extends downward through the aforesaid steel tube 9 and the steel bar 10. Each of the just mentioned bolts 14 is therefore seen to firmly hold three of the parts of this invention together. It is obvious from examination of FIGS. 1 and 2 of the accompanying drawing that there are two of the aforesaid spring teeth 12 on each end of the steel bar 10. It is also obvious that a cultivator may have any number of these inventions secured longitudinally in spaced relation to the same.

A support fitting 15 embodies a steel tube 16, to which is welded or otherwise secured a piece of steel plate 17, supports the aforesaid steel tube 9 and its associated parts in the manner shown in the drawing. A lock screw and nut 18 locks the tube 9 in place in the aforesaid support fitting 15. The fitting 15 is provided with two spaced nuts and bolts 19 for securing this invention to the spring tooth shank 8 of the cultivator which is partly shown in phantom lines in FIG. 1 of the drawing.

Looking one more time at FIG. 1 of the accompanying drawing it will be seen that the aforesaid steel tube 9 and its steel bar 10 are provided with a plurality of spaced openings 20 through which passes the bolts 14. This construction permits the longitudinal adjustment of the two spring teeth 12, as will be understood by those experienced in the farm machinery art.

This invention is subject to any and all changes and/or modifications in its designs and/or construction in so long as the changes and/or modifications fall within the scope and intent of the appended claims.

What I now claim as new is:

1. A harrow attachment for cultivators comprising the combination of a spring tooth shank of a cultivator, said shank having bores intermediate its height, a horizontally disposed tube, said tube having a mounting plate fixed across the rear of the tube and extending tangentially upward therefrom, said plate being positioned against the rear face of said shank, said plate having bores in alignment with said shank bores, bolts passing through said bores in said plate and said bores in said shank to fix said plate and tube to said shank, an elongated cylindrical member, said member being mounted in said tube centrally of the length of said member, said tube having a threaded bore, a bolt threaded into said bore in said tube against said member to lock said member to said tube, a pair of elongated rods each having their lower ends extending downward to form harrow teeth with their upper ends wound around the opposing outer ends of said member and with each of said upper ends terminating in a loop on said member, said member having a plurality of bores aligned in a row along each outer end of said member, a bolt at each outer end of said member passing through said loops and through one of the plurality of bores at each of the outer ends of said member to lock said loops of said rods to said member, said member being rotatably mounted in said tube whereby said bolt threaded into said tube may be loosened and retightened to rotate the member to different angles to adjust the rods to different angles relative to the shank.